(12) United States Patent
Lee et al.

(10) Patent No.: US 9,508,010 B2
(45) Date of Patent: Nov. 29, 2016

(54) APPARATUS FOR VIDEO TO TEXT CONVERSION USING VIDEO ANALYSIS

(71) Applicants: REALHUB CORP., LTD., Busan (KR); Seong Wook Ha, Busan (KR)

(72) Inventors: Kang-seok Lee, Busan (KR); Seong Wook Ha, Busan (KR)

(73) Assignees: Realhub Corp., Ltd. (KR); Seong Wook Ha (KR)

( * ) Notice: Subject to any disclaimer, the term of this patent is extended or adjusted under 35 U.S.C. 154(b) by 0 days.

(21) Appl. No.: 14/564,354

(22) Filed: Dec. 9, 2014

(65) Prior Publication Data

US 2015/0235089 A1    Aug. 20, 2015

(30) Foreign Application Priority Data

Feb. 20, 2014  (KR) .................. 10-2014-0019547

(51) Int. Cl.
| | | |
|---|---|---|
| G06K 9/00 | (2006.01) | |
| G06T 7/20 | (2006.01) | |
| G06K 9/62 | (2006.01) | |
| G06F 17/30 | (2006.01) | |

(52) U.S. Cl.
CPC ..... *G06K 9/00718* (2013.01); *G06F 17/30781* (2013.01); *G06K 9/00751* (2013.01); *G06K 9/6201* (2013.01); *G06T 7/20* (2013.01)

(58) Field of Classification Search
None
See application file for complete search history.

(56) References Cited

U.S. PATENT DOCUMENTS

| | | | | |
|---|---|---|---|---|
| 2005/0196043 A1* | 9/2005 | Jung | ................ | G06K 9/325 382/176 |
| 2007/0273696 A1* | 11/2007 | Cheng | ................ | G06K 9/00771 345/467 |
| 2009/0154768 A1* | 6/2009 | Bell | ................ | G06K 9/2054 382/103 |
| 2010/0254605 A1* | 10/2010 | Wredenhagen | .... | G06K 9/00711 382/176 |
| 2013/0129307 A1* | 5/2013 | Choe | ................ | H04N 5/2621 386/227 |

OTHER PUBLICATIONS

Rout, A Survery on Object Detection and Tracking Algorithms', Jun. 2013.*

* cited by examiner

*Primary Examiner* — Jason Heidemann
*Assistant Examiner* — Brian Shin
(74) *Attorney, Agent, or Firm* — Park & Associates IP Law, P.C.

(57) ABSTRACT

An apparatus for video to text conversion using video analysis, which analyzes at least one object included in video data input from a video acquisition device and provides motion information and attribution information of the object in the form of a sentence or word arrangement according to patterns. The apparatus includes an analysis unit, a generation unit, a database unit and a production unit.

6 Claims, 1 Drawing Sheet

APPARATUS FOR VIDEO TO TEXT CONVERSION USING VIDEO ANALYSIS

REFERENCE TO RELATED APPLICATIONS

This application claims the priority benefit of Korean Patent Application No. 10-2014-0019547 filed on Feb. 20, 2014, the entire contents of which are incorporated herein by reference.

FIELD OF THE INVENTION

The present invention relates, in general, to an apparatus for video to text conversion using video analysis and, more particularly, to an apparatus for video to text conversion using video analysis, which analyzes at least one object included in video data input from a video acquisition device and provides motion information and attribution information of the object in the form of a sentence or word arrangement according to patterns.

BACKGROUND OF THE INVENTION

A video acquisition device, such as a CCTV, which acquires and stores video data in real time, is installed at a place where an incident such as a crime or traffic accident has frequently occurred in recent years.

The follow-up treatment of the incident such as the crime or traffic accident can be rapidly performed through video data analysis of the place, acquired and stored by the video acquisition device.

That is, motion information of objects such as persons and vehicles is extracted by analyzing, in various manners, the video data on the incident such as the crime or traffic accident, acquired and stored in real time from the video acquisition device, so that relative information on the incident can be easily acquired through the motion information of the objects, thereby performing rapid follow-up treatment.

In a conventional art, when motions of objects are extracted by analyzing video data, the analysis environment of the video data is set suitable for characters of a place where the video data are acquired, and motion information of the objects is extracted by analyzing the video data based on the analysis environment, so that important clues necessary for solving an incident are provided.

That is, in a conventional search device for video analysis, there is an inconvenience in that the analysis environment described above should be separately determined for a specific place. In addition, there is a limitation in that motion information of objects, which becomes a clue for solving an incident, is not properly extracted according to the analysis environment.

The conventional search device for video analysis has a structure in which a clue for solving an incident is passively provided by analyzing video data and extracting motion information of objects according to a manager's request after the incident occurs. Therefore, there is a disadvantage in that the contextual details of the incident are not actively extracted using the motion information of the objects.

In order to solve these problems, an intelligent search robot for video analysis of the following Patent Document 1, which extracts motion information of objects by automatically analyzing video data according to scheduling while automatically setting an analysis environment, and classifies the video data into a plurality of events and then stores the classified events, has already been registered by the present applicant.

Meanwhile, a technique for providing an event in a text form is further required so that a manager effectively searches video information including clues in the occurrence of an incident, such as a crime or traffic accident, through the event provided in written form by the intelligent search robot for video analysis, thereby more rapidly treating and dealing with the corresponding incident.

That is, a technique is required in which events according to objects analyzed from video data through video analysis are converted into text by producing a sentence or word arrangement through information of the objects included in the events, thereby facilitating the more rapid searching of a video in which a corresponding event is included.

SUMMARY OF THE INVENTION

Accordingly, the present invention has been made keeping in mind the above problems occurring in the prior art, and an object of the present invention is to provide an apparatus for video to text conversion using video analysis, which analyzes at least one object included in video data input from a video acquisition device and classifies the video data into a plurality of patterns according to motion information and attribute information of the object, thereby generating one of a plurality of events corresponding to the patterns, and simultaneously provides the motion information and attribute information of the object in the form of a sentence or word arrangement by combining words corresponding to the motion information and attribute information of the object according to the motion information and attribute information of the object and the patterns.

In accordance with an aspect of the present invention, there is provided an apparatus for video to text conversion using video analysis, the apparatus including: an analysis unit configured to receive video data composed of a plurality of frames, input from a video acquisition device to extract area information of at least one object, represented for each frame of the video data, thereby analyzing attribute information of the object together with motion information of the object, which changes for each time period from the area information of the object; a generation unit configured to classify the video data into a plurality of patterns according to the motion information and attribute information of the object, analyzed in the analysis unit, thereby selectively generating one of a plurality of events corresponding to the patterns; a database unit configured to store a word set corresponding to the motion information and attribute information of the object, analyzed in the analysis unit; and a production unit configured to search words corresponding to the motion information and attribute information of the object that becomes a subject of the event generated in the generation unit in the word set of the database unit and combine the searched words according to the attribute information, the motion information and the pattern, thereby producing a sentence or word arrangement.

The apparatus may further include a storage unit configured to store the sentence or word arrangement produced in the production unit together with an index including information on a time when the event is generated.

The apparatus may further include an output unit configured to output the sentence or word arrangement and the index, stored in the storage unit, when the event is generated.

The analysis unit may include a pixel detection unit configured to detect a plurality of pixels of which pixel values are changed depending on a frame in a pixel area of the video data; an object extraction unit configured to extract area information of the object in a quadrangular shape by connecting the plurality of pixels detected in the pixel detection unit in up, down, left and right directions; a motion analysis unit configured to analyze the motion information of the object based on a form in which the area information of the object, extracted in the object extraction unit, is changed for each frame of the video data; and an attribute analysis unit configured to analyze the attribute information of the object based on a pixel size and pixel values of the area information of the object, extracted from the object extraction unit.

The pattern, according to the motion information of the object, analyzed in the pixel area of the video data, may include a first pattern in which at least two objects meet each other, a second pattern in which the moving direction of at least one object is changed, a third pattern in which the moving speed of at least one object is changed, and a fourth pattern in which at least three objects are gathered.

The attribute information of the object may include a first attribute for distinguishing the object as one of a person and a thing, and a second attribute for distinguishing the object based upon color.

The sentence or word arrangement may include a subject part representing the attribute information of the object, and a predicate part representing the motion information of the object.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
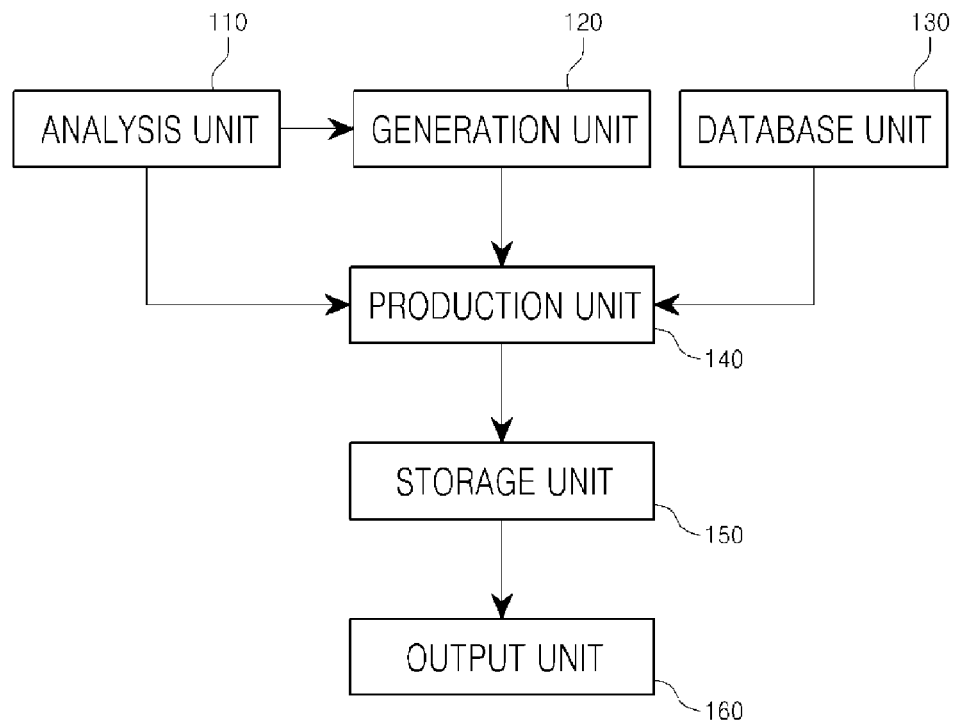
FIG. 1 is a block diagram illustrating an apparatus for video to text conversion using video analysis in accordance with an embodiment of the present invention.

Hereinafter, embodiments of the present invention will be described in detail with reference to the accompanying drawings. Reference now should be made to the elements of drawings, in which the same reference numerals are used throughout the different drawings to designate the same elements. In the following description, detailed descriptions of known elements or functions that may unnecessarily make the gist of the present invention obscure will be omitted.

An apparatus for video to text conversion using video analysis in accordance with the present invention is an apparatus which generates one of events corresponding to a plurality of patterns that hint an incident by analyzing, in real time, objects included in video data acquired in a video acquisition device such as a CCTV, installed at a place where an incident such as a crime or traffic accident frequently occurs, and then converts the video data into text in the form of a sentence or word arrangement according to attribute information and motion information of an object that becomes a subject of the event.

That is, as compared with the conventional manner that generates only events, the apparatus more efficiently search video data including a clue of an incident by converting the video data into text in the form of a sentence or word arrangement based on attribute information and motion information of an object according to an event, thereby more rapidly treating and handling the corresponding incident.

This is achieved by the configuration of the apparatus, including an analysis unit for analyzing attribute information and motion information of an object included in video data, a generation unit for classifying the video data into a plurality of patterns according to the attribute information and motion information of the object, thereby generating events corresponding to the classified patterns, a database unit for storing a word set corresponding to the motion information and attribute information of the object, and a production unit for searching, in the word set, words corresponding to the motion information and attribute information of the object that becomes a subject of the events, thereby producing a sentence or word arrangement.

Thus, events generated by being classified into a plurality of patterns are provided in the form of a sentence or word arrangement through analysis with respect to an object included in video data, so that it is possible to perform search in a text-based manner when an incident occurs and to rapidly and easily acquire clues of a corresponding incident caused by an event, thereby effectively treating and handling the corresponding incident.

Hereinafter, an embodiment of the present invention will be described in detail with reference to the accompanying drawings.

Figure 2:
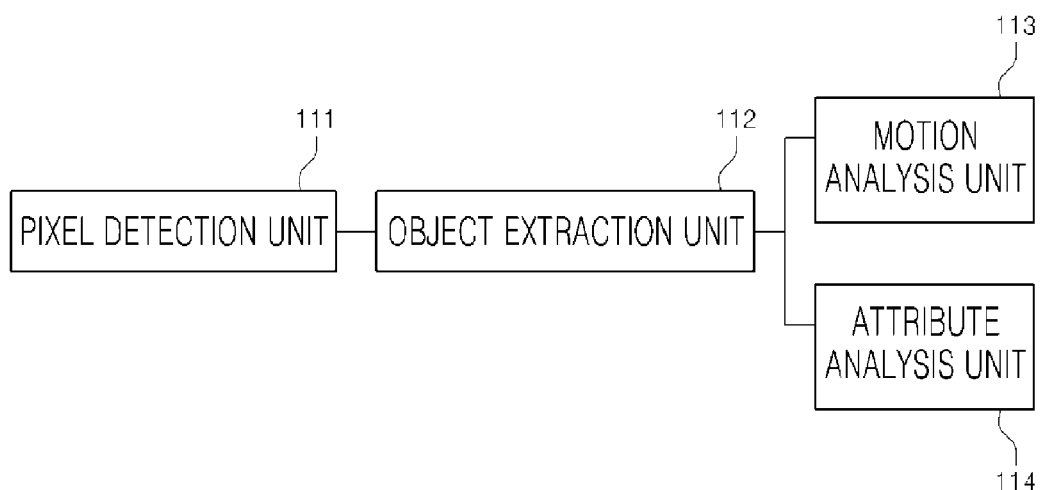
FIG. 2 is a block diagram illustrating an analysis unit of the apparatus in accordance with the embodiment of the present invention.

FIG. 1 is a block diagram illustrating an apparatus for video to text conversion using video analysis in accordance with an embodiment of the present invention. FIG. 2 is a block diagram illustrating an analysis unit of the apparatus in accordance with the embodiment of the present invention.

The apparatus 100 in accordance with the embodiment of the present invention, as shown in FIG. 1, may include an analysis unit 110, a generation unit 120, a database unit 130 and a production unit 140.

First, the analysis unit 110 is a component that receives video data input from a video acquisition device to analyze motion information and attribute information of an object, represented in the video data.

That is, the analysis unit 110 receives, in real time, video data composed of at least one frame, input from the video acquisition device to extract at least one area information of an object, represented for each frame of the image data, thereby analyzing attribute information of the object together with motion information of the object, changed for each time period.

In this state, the analysis unit, as shown in FIG. 2, may include a pixel detection unit 111, an object extraction unit 112, a motion analysis unit 113 and an attribute analysis unit 114.

The pixel detection unit 111 is a component that detects a plurality of pixels of which pixel values are changed depending on a frame in a pixel area of video data.

That is, if frames of time periods t and t+1 are differentiated, pixels each of which pixel value is not less than a threshold value are extracted.

The object extraction unit 112 is a component that connects the plurality of pixels detected from the pixel detection unit in up, down, left and right directions, thereby extracting the area information of the object in a quadrangular shape.

That is, pixels each of which pixel value is not less than the threshold are connected in up, down, left and right directions, and the area information of the object is extracted in a quadrangular shape based on pixels existing at the outermost sides, thereby obtaining the area information of the object.

However, an object having a pixel area mostly corresponding to the area information of the object, extracted in a frame of the previous time period in the area information of the object, extracted in a frame of time period t+2 is decided as the same object, thereby updating the area information of the object for each time period The motion analysis unit 113 is a component that analyzes the motion information of the object based on a form in which the area information of the object, extracted from the object extraction unit 112, is changed depending on frames of the video data.

That is, the motion analysis unit 113 analyzes whether the motion information of the object has a form in which, like a plurality of patterns to be described later, two objects meet each other, a form in which the moving direction of at least one object is changed, a form in which the moving speed of at least one object is changed, or a form in which at least three objects are gathered.

The attribute analysis unit 114 is a component that analyzes the attribute information of the object based on a pixel size and pixel values of the area information of the object, extracted from the object extraction unit 112. In this state, the attribute information of the object may include a first attribute for distinguishing the object as one of a person and a thing, and a second attribute for distinguishing the object based upon color.

That is, the attribute analysis unit 114 analyzes whether the corresponding object is a person or vehicle based on the entire pixel size of the area information of the object and which color the corresponding object has based on the pixel values of the area information of the object.

For example, if the pixel size of the area information of the object is greater than a predetermined pixel size, the attribute analysis unit 114 determines the object to be a person when the pixel size of the area information of the object is smaller than that previously set to the vehicle. The attribute analysis unit 114 determines the color of the object analyzed as the vehicle or person according to RGB values that pixel values provided by the pixels of the area information of the object.

In this state, the video data is acquired by photographing a specific area with a predetermined pixel size, and thus it is possible to perform analysis for distinguishing an object as a person or vehicle based on the predetermined pixel size.

Next, the generation unit 120 is a component that classifies the video data into a plurality of patterns according to the motion information and attribute information of the object, analyzed in the analysis unit 110, thereby selectively generating one of the plurality of events corresponding to the patterns.

In this state, the patterns, according to the motion information of the object, analyzed in the pixel area of the video data, may be classified into a first pattern in which two objects meet each other, a second pattern in which the moving direction of at least one object is changed, a third pattern in which the moving speed of at least one object is changed, and a fourth pattern in which at least three objects are gathered.

That is, the first pattern includes all situations in which area information of different two or more objects approach within a predetermined pixel, including a situation in which the area information of the objects are engaged with each other. The first pattern generates a first event.

The second pattern includes all situations in which the moving direction is changed to a specific angle or more in at least the pixel area by comparing motion information of a specific object of time periods t and t+1. The second pattern generates a second event.

The third pattern includes all situations in which the moving speed is increased or decreased in a state in which the moving distance of time periods t+1 to t+2 is different by a predetermined value or more from that according to motion information of a specific object of time periods t to t+1. The third pattern generates a third event.

The fourth pattern includes all situations in which area information of at least three objects are gathered within a predetermined pixel area. The fourth pattern generates a fourth event.

Next, the database unit 130 is a component that stores a word set corresponding to the motion information and attribute information of the object, analyzed in the analysis unit 110.

That is, the database unit 130 stores, in a data form, a word set composed of words required to convert the attribute information and motion information of the object into text according to the pattern.

For example, among the attribute information of the object, the database unit 130 stores nouns including "person," "vehicle" and the like, which represent kinds of objects among the attribute information of the object, articles including "one," "two," "three" and the like, which represent numbers of objects, nouns including "black," "red," "yellow" and the like, which represent colors of objects, verbs including "meet each other," "change moving direction," "change moving sped," "gather" and the like, which represent the motion information of the object according to patterns, auxiliary words including "in," "with," "of" and the like, which are used together with nouns in order to naturally connect the nouns and the verbs.

Next, the production unit 140 is a component that searches, in the word set of the database unit 130, words corresponding to the motion information and attribute information of the object that becomes a subject of the event generated in the generation unit 120, and produces a sentence or word arrangement by combining the searched words according to the attribute information, the motion information and the pattern.

That is, the production unit 140 converts a corresponding event into a sentence and word arrangement. In this case, the production unit 140 produces a sentence or word arrangement according to the pattern where the corresponding event is classified in a state in which the motion information and attribute information of the object that becomes a subject of the corresponding event are included in the sentence or word arrangement.

Here, the sentence or word arrangement may include a subject part representing the attribute information of the object, and a predicate part representing the motion information of the object.

For example, when an event corresponding to the first pattern is generated, the production unit 140 produces a completed sentence, i.e., "two persons meet each other", or a word arrangement, i.e., "two, persons, meet each other".

Here, the apparatus 100 in accordance with the embodiment of the present invention, as shown in FIG. 1, may further include a storage unit 150 for storing a sentence or word arrangement produced in the production unit 140 together with an index including information on a time when the event is generated.

In this state, the storage unit 150 is a component that stores a sentence or word arrangement produced in the production unit 140 together with a time when the event is generated, thereby easily searching sentences or word arrangements according to subsequent events based on time.

The apparatus 100 in accordance with the embodiment of the present invention, as shown in FIG. 1, may further include an output unit 160 for outputting a sentence or word arrangement and an index, stored in the storage unit 150 whenever an event is generated.

The output unit 160 is a component that automatically outputs, on a screen, a sentence or word arrangement and an index, corresponding to an event, to express the generation of the event without any manager's request. Accordingly, the manager can rapidly recognize the generation of the event.

According to the present invention configured as described above, an event classified into a plurality of patterns is generated by analyzing attribute information and motion information of at least one object included in video data acquired from the video acquisition device, and a sentence or word arrangement is produced according to the attribute information and motion information of the object that becomes a subject of the event, thereby converting the video data into text. Accordingly, it is possible to more efficiently searching video information including a clue when an incident such as a crime or traffic accident, thereby more rapidly treating and coping with the corresponding incident.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for video to text conversion using video analysis, the apparatus comprising:
   a video to text convert processor adapted to receive video data composed of a plurality of frames input from a video acquisition device, which compares pixels of a first frame against pixels of a second frame and identifies pixels of which their red-green-blue (RGB) pixel values were changed greater than a predetermined threshold value, identifies one or more objects in the received video data, each of the objects being defined with a quadrangular shaped object area information created by selecting four outermost positioned pixels among the pixel value altered pixels, classifies attribute information of each of the objects according to a size of the object area information in conjunction with the red-green-blue pixel value of each of the pixels defining the quadrangular shaped object area information of the respective object, identifies motion information of each of the objects identified in the video data, which changes for each time period from the area information of the object, identifies a pattern among a plurality of patterns represented by the motion information and attribute information of each of the objects identified in the video data thereby selectively determining one of a plurality of events corresponding to the identified pattern, and searches a database for words corresponding to the motion information and the attribute information of each of the identified objects, and combines the searched words to generate a sentence or word arrangement corresponding to the event,
   wherein the searched word that corresponds to the attribute information of each of the identified objects is used as a subject part in the sentence or word arrangement, and the searched word that corresponds to the moving information of each of the identified objects is used as a predicate part in the sentence or word arrangement corresponding to the identified event.

2. The apparatus of claim 1, wherein the video to text convert processor is configured to store the sentence or word arrangement produced in the production unit together with an index including information on a time when the event is generated.

3. The apparatus of claim 2, further comprising a screen configured to output the sentence or word arrangement and the index, when the event is generated.

4. The apparatus of claim 1, wherein the video acquisition device provides images of a specific fixed area.

5. The apparatus of claim 1, wherein the pattern identifiable by the video to text convert processor includes a first pattern in which at least two objects meet each other, a second pattern in which the moving direction of at least one object is changed, a third pattern in which the moving speed of at least one object is changed, and a fourth pattern in which at least three objects are gathered.

6. The apparatus of claim 1, wherein the attribute information of each of the objects includes a first attribute and a second attribute, the first attribute defining the respective object as one of a person and a vehicle, and a second attribute defining a color of the respective object.

\* \* \* \* \*